United States Patent

Hashizume et al.

Patent Number: 6,022,911
Date of Patent: Feb. 8, 2000

[54] SURFACE-TREATED COLOR PIGMENT, COLORED SUBSTRATE PARTICLES AND PRODUCTION PROCESS THEREOF

[75] Inventors: Yoshiki Hashizume, Kawachi-Nagano; Satosi Kobayashi, Kobe, both of Japan

[73] Assignee: Toyo Aluminium Kabushiki Kaisha, Osaka-fu, Japan

[21] Appl. No.: 09/231,550

[22] Filed: Jan. 15, 1999

Related U.S. Application Data

[62] Division of application No. 08/683,883, Jul. 19, 1996.

[30] Foreign Application Priority Data

| Jul. 27, 1995 | [JP] | Japan | 7-192098 |
| Sep. 5, 1995 | [JP] | Japan | 7-228227 |
| Oct. 27, 1995 | [JP] | Japan | 7-280461 |
| Feb. 1, 1996 | [JP] | Japan | 8-16705 |

[51] Int. Cl.$^7$ ............................................. C08K 9/06
[52] U.S. Cl. ............................................. 523/213; 106/413
[58] Field of Search ............................ 106/413; 523/213

[56] References Cited

U.S. PATENT DOCUMENTS

| 3,573,946 | 4/1971 | Wolf et al. |
| 3,973,982 | 8/1976 | Bingham |
| 4,869,754 | 9/1989 | Kawabe et al. |
| 5,480,481 | 1/1996 | Setoguchi et al. |
| 5,482,547 | 1/1996 | Bugnon et al. |
| 5,494,512 | 2/1996 | Yamamoto et al. |
| 5,540,768 | 7/1996 | Yamamoto |
| 5,667,579 | 9/1997 | Oehlert et al. |

FOREIGN PATENT DOCUMENTS

| 2 281 410 | 3/1976 | France |
| 43 22 886 A1 | 1/1995 | Germany |
| 58141248A | 8/1983 | Japan |
| 1162036 | 9/1967 | United Kingdom |
| WO 91/04293 | 4/1991 | WIPO |

OTHER PUBLICATIONS

Database WPI Week 7801 Derwent XP–002056429 & JP 52 136 226 Nov. 1977.
Database WPI Week 8513 Derwent XP–002056430 & JP 60 031 576 A Feb. 1985.
Database WPI Week 8534 Derwent XP–002056431 & JP 60 130 655 Jul. 1985.
Database WPI Week 9232 Derwent XP–002056432 & JP 04 178 471 A Jun. 1992.
Database WPI Week 8950 Derwent XP–002056433 & JP 01 275 666 A.
Database WPI Week 7914 Derwent XP–002056434 & JP 54 026 975 Feb. 1979.
Database WPI Week 9315 Derwent XP–002056435 & JP 05 059 297 A Mar. 1993.
Database WPI Week 9315 Derwent XP–002056436 & JP 05 059 318 A Mar. 1993.

*Primary Examiner*—Edward J. Cain
*Attorney, Agent, or Firm*—Nixon & Vanderhye

[57] ABSTRACT

Colored substrate particles which are mainly used in metallic finish of automobiles, domestic electrical articles, tools and the like, decorative finish of plastics, printing ink and the like are disclosed herein. According to the present invention, adhesive property of a color pigment to substrate particles is improved by coating the surface of the color pigment with a specific surface-treatment agent. The colored substrate particles are preferably coated with a polymer polymerized by in situ polymerization, thereby the adhesion of the color pigment to the substrate particles can be further improved.

14 Claims, 2 Drawing Sheets

SURFACE-TREATED COLOR PIGMENT, COLORED SUBSTRATE PARTICLES AND PRODUCTION PROCESS THEREOF

This is a division of application Ser. No. 08/683,883, filed Jul. 19, 1996.

FIELD OF THE INVENTION

This invention relates to colored substrate particles which are mainly used in metallic finish of automobiles, domestic electrical articles, tools and the like, decorative finish of plastics, printing ink and the like, a process for the production thereof and a resin composition comprising them.

PRIOR ART

Aluminum flakes are conventionally used in metallic finish, decorative finish of plastics or printing ink. When aluminum flakes are used by coloring them, said aluminum flakes are mixed with a color pigment. In that case, it poses a problem in that a clear color tone cannot be obtained easily due to emphasized color of the achromatic aluminum flakes.

A colored flaky pigment is also used in which inorganic flakes such as of mica are used in stead of aluminum flakes. Though a characteristic pearlesceent color tone can be obtained, it also f causes problems such as limited color tones, difficulty in obtaining metallic luster and the like. Each of them has a poor hinding power because of its large thickness that it causes a problem in that smoothness of the paint film surface is spoiled and image clarity is lost when its blending amount is increased in order to give the hinding power.

Similar problems also occur when a metallic pigment is molded with a resin for the purpose of obtaining a decorative effect.

In order to resolve the aforementioned problems, a method has been proposed in which each aluminum flake is colored by adhering a pigment thereto by resin coating or other means (for example, Japanese Patent Application Laying Open (KOHYO) No. 5-508424 and Japanese Patent Publication (KOKOKU) No. 6-92546), but clear color tones cannot be obtained by such a method due to a difficulty in effecting adhesion of enough amount of pigment. Even if adhered amount of a pigment could be increased, it would also cause other problems such as easy fall off of the pigment, complex steps and the like.

In addition, anisotropy of paint film color is one of the characteristics of metallic coating, but conspicuous anisotropy cannot be obtained by the prior art paint film forming method in which metal flake pigments or mica powders are used.

While, powder coatings are also used widely in powder metallic coating finish of automobiles, domestic electrical articles, tools and the like as low-pollution type paints in which organic solvents are not used.

When a powder coating which contains a colored metallic pigment is used in powder metallic coating finish, it is difficult to arrange the metallic pigment in parallel with the base material, thus posing a problem in that the metallic pigment to be blended in the powder coating must be used in a larger amount than that of the case of a solvent type paint, in order to create a metallic touch, as well as another problem in that a paint film having proper appearance cannot be obtained. Such problems are caused by the aptness of the metallic pigment to be exposed on the paint film surface, so that a clear color can hardly be obtained even by the addition of a colored pigment due to emphasized color of the metallic pigment. Also, since separation and uneven distribution of the metallic pigment easily occur when the paint is melted to make it into films, aptness of the metallic coating to be distributed unevenly around the paint film surface becomes another cause of the difficulty in obtaining a clear color.

Metallic pigments so far developed for use in powder coatings are those which are coated in advance with resins by spray drying and the like means (for example, Japanese Patent Application Laying Open (KOKAI) No. 51-137725 and Japanese Patent Publication (KOKOKU) No. 57-35214). In the case of these metallic pigments, their transfer efficiency in electrostatic powder coating is improved by the precoating of the metallic pigment with a resin, but the aforementioned problems in relation to the appearance still remain unsolved. In addition, the spray drying step of metallic pigments entails a danger of taking fire of solvents or causing dust explosion, and the resulting dry powders apt to agglomerate which may cause seeds and the like defects when powder coating is carried out.

A process in which a metallic pigment is thoroughly kneaded in advance with a resin and a color pigment by a melt blend method may be considered, but the metallic pigment is apt to receive deformation during its kneading step or a step for controlling particle size of the resulting powder coating by disintegration or the like means, so that a paint film having proper appearance can hardly be obtained.

A main object of the present invention is to improve the problematic chroma of the prior art metallic pigments, thereby providing substrate particles colored to a high chroma by adhering a color pigment to substrate particles such as aluminum flakes.

Another object of the present invention is to resolve color pigment fall off, complex steps and other problems involved in the prior art coloring method of metallic pigments, thereby providing colored substrate particles most suited for use in paints, ink or resin molding and a process for the production thereof.

A further object of the present invention is to provide a paint composition and a method for the formation of paint film, by which excellent paint film appearances surpassing the conventional metallic coating can be obtained. The term "appearance of paint films" as used herein means clearness of color, anisotropy of color, metallic touch and other color tones, presence of seeds, irregular color and other defects and painted surface luster.

SUMMARY OF THE INVENTION

In order to achieve these objects, it is necessary at least to adhere a color pigment to the entire surface of each substrate particle, because, when substrate particles to which the pigment is not adhered are present, direct reflection of light from such particles will spoil clearness of the color tone, and when they are used in paints, ink or resin molding, generation of pigment-free substrate particles due to fall off of the pigment during their production steps will also spoil clearness of the color tone.

DETAILED EXPLANATION OF THE INVENTION

Figure 1:
FIG. 1 is a scanning electron microphotograph showing particle structure of the colored substrate particles prepared in Example 1-2.

A first aspect of the present invention relates to a surface-treated color pigment suitable for use in colored substrate particles, in which adhesive property of a color pigment to substrate particles is improved by coating the surface of the color pigment with a surface-treatment agent selected from a monobasic aromatic carboxylic acid and an amino compound having 2 amino groups in its molecule and not having carboxyl group.

The color pigment to be used in the present invention is not particularly limited, and any of organic and inorganic pigments such as of those illustrated below can be used. A suitable pigment may have a primary particle size of from 0.01 to 1 μm, preferably from 0.02 to 0.1 μm.

Illustrative examples of useful pigments include those which belong to phthalocyanine, halogenated phthalocyanine, quinacridone, diketopyrrolopyrrole, isoindolinone, azomethine metal complex, indanthrone, perylene, perynone, anthraquinone, dioxazine, benzoimidazolone, condensed azo, triphenylmethane, quinophthalone, anthrapyrimidine, titanium oxide, iron oxide and carbon black.

Particularly preferred pigments from the viewpoint of adhesive property and tinting strength include phthalocyanine blue, phthalocyanine green, quinacridone red, quinacridone maroon, quinacridone gold, diketopyrrolopyrrole, isoindolinone orange, isoindolinone yellow, dioxazine violet, perylene maroon, azomethine copper complex, anthrapyrimidine yellow, microdust titanium oxide, transparent iron oxide and carbon black.

According to the present invention, the color pigment should be subjected to a surface-treatment using a surface-treatment agent selected from a monobasic aromatic carboxylic acid and an amino compound having 2 amino groups in its molecule and not having carboxyl group. This surface-treatment agent of the present invention exerts an effect to improve adhesion of a color pigment to substrate particles.

Illustrative examples of the monobasic aromatic carboxylic acid to be used as one of the surface-treatment agents in the present invention include benzoic acid, vinyl benzoate, salicylic acid, anthranilic acid, m-aminobenzoic acid, p-aminobenzoic acid, 3-amino-4-methylbenzoic acid, 3,4-diaminobenzoic acid, p-aminosalicylic acid, 1-naphthoic acid, 2-naphthoic acid, naphthenic acid, 3-amino-2-naphthoic acid, cinnamic acid and aminocinnamic acid.

Of these aromatic carboxylic acids, benzoic acid, an aminobenzoic acid (anthranilic acid or the like), an aminohydroxybenzoic acid (aminosalicylic acid or the like), a naphthoic acid (2-naphthoic acid or the like), an aminonaphthoic acid (3-amino-2-naphthoic acid or the like), cinnamic acid and aminocinnamic acid are preferred because of particularly excellent adhesive property of the surface-treated color pigment when substrate particles are coated.

Illustrative examples of the amino compound having 2 amino groups in its molecule and not having carboxyl group, to be used as another surface-treatment agent in the present invention, include ethylenediamine, trimethylenediamine, tetramethylenediamine, pentamethylenediamine, hexamethylenediamine, 1,7-diaminoheptane, 1,8-diaminooctane, 1,10-diaminodecane, 1,12-diaminododecane, o-phenylenediamine, m-phenylenediamine, p-phenylenediamine, 1,8-diaminonaphthalene, 1,2-diaminocyclohexane, stearylpropylenediamine, N-β-(aminoethyl)-γ-aminopropyltrimethoxysilane and N-β-(aminoethyl)-γ-aminopropylmethyldimethoxysilane.

Of these amino compounds, at least one compound selected from an aliphatic diamine having 6 to 12 carbon atoms, N-β-(aminoethyl)-γ-aminopropyltrimethoxysilane and N-β-(aminoethyl)-γ-aminopropylmethyldimethoxysilane is preferred because of particularly excellent adhesive property of the surface-treated color pigment when substrate particles are coated.

The surface-treatment agent is used in an amount of preferably from 0.2 to 100 parts by weight, more preferably from 0.5 to 50 parts by weight, based on 100 parts by weight of the color pigment. When amount of the surface-treatment agent is too small, it becomes difficult for the color pigment to adhere onto the substrate particles, while too large amount will cause a problem in that the color pigment cannot be fixed sufficiently to the substrate particles even when the substrate particles to which the surface-treated color pigment is adhered are coated with a polymer and another problem in that, when the colored substrate particles are blended with a paint or paint film, excess surface-treatment agent increases viscosity of the paint or deteriorates weathering resistance of the paint film.

The surface of the aforementioned surface-treated color pigment of the present invention may be further coated with an aluminum or titanium chelate compound. These chelate compounds exert an effect to improve dispersibility of the color pigment in a nonpolar solvent, thereby effecting uniform adhesion of the color pigment to the substrate particles.

Illustrative examples of the chelate compound to be used in the present invention include dialkoxyaluminum alkylacetoacetate, aluminum trialkylacetoacetate, aluminum triacetylacetonate, aluminum acetylacetonate bisethylacetoacetate, aluminum isopropoxide alkylphosphate alkylacetoacetate, titanium tetraacetylacetonate, dialkoxytitanium bisacetylacetonate and dialkoxybistriethanolamine titanate.

The chelate compound may be used in an amount of preferably from 0.1 to 50 parts by weight, more preferably from 0.5 to 20 parts by weight, based on 100 parts by weight of the color pigment. When amount of the chelate compound is too large, it will cause a problem in that the pigment cannot be fixed sufficiently to the substrate particles even when the substrate particles to which the surface-treated color pigment is adhered are coated with a polymer and another problem in that, when the colored substrate particles are blended with a paint or paint film, excess chelate compound increases viscosity of the paint or deteriorates weathering resistance of the paint film. On the other hand, the amount if too small would bear no clear color due to a difficulty in uniformly and finely adhering the color pigment to the substrate particles.

A second aspect of the present invention relates to colored substrate particles in which the aforementioned surface-treated color pigment is adhered to substrate particles.

Substrate particles to be used as the base material in the present invention are not particularly limited. Their preferred examples include metal flakes such as of aluminum, zinc, copper, bronze, nickel, titanium and stainless steel and inorganic flakes such as of mica and glass. Of these materials, aluminum flakes are particularly preferable, because they have excellent metallic luster and hinding power, are inexpensive and can be handled easily due to small specific gravity. Preferably, the flaky substrate particles may have a thickness of 0.1 to 5 μm, an average particle size of 5 to 100 μm and a shape factor, calculated by dividing the average particle size by the thickness, of about 5 to 100.

In addition to these flaky substrate particles, granular particles (such as of aluminum, stainless steel and other metals, alumina and other ceramics, glass and the like) having a particle size of approximately from 5 to 1,000 μm, preferably from 10 to 100 μm, may also be used as the substrate particles. Colored substrate particles prepared making use of these substrate particles can be used suitably as spherical particles for decoration use, spacers of liquid-crystal reflectors. Also, colored granular substrate particles in which carbon black is used as the pigment can be used as conductive fillers.

Amount of the surface-treated color pigment to be adhered to substrate particles is preferably from 0.01 to 0.5 g, more preferably from 0.03 to 0.3 g, per 1 m² surface area of the substrate particles. Adhered amount of the surface-treated color pigment if too small would bear no sufficient coloring, while the amount if too large would cause easy fall off of the surface-treated color pigment.

It is ideal to adjust thickness of the color pigment layer to the size of one particle of the color pigment by controlling adding amount of the color pigment, because such a treatment renders possible not only efficient and clear coloring of individual substrate particle but also easy fixing of the color pigment on the surface of the substrate particles and prevention of fall off of the color pigment during production steps of paints to-the minimum.

In the colored substrate particles to which the surface-treated color pigment was adhered, the color pigment is well dispersed and uniformly adhered to the surface of the colored substrate particles as shown in FIG. 1. The colored substrate particles also show a clear color tone and has excellent metallic luster.

Adhesive property of the color pigment to the substrate particles can be improved by coating the surface of the color pigment adhering to the substrate particles with a polymer. Thus, if necessary, the surface of the color pigment adhered to the surface of the substrate particles may be coated with a polymer synthesized by in situ polymerization of a polymerizable monomer. The term "in situ polymerization" as used herein means that a polymerizable monomer is polymerized during the production step of the colored substrate particles. The resulting polymer penetrates into gaps between the color pigment and the surface of substrate particles, thereby taking a role in the fixation of the color pigment to the substrate particles to improve adhesion of the color pigment to the substrate particles.

Amount of the coating polymer may be preferably from 0.5 to 100 parts by weight, more preferably from 0.5 to 40 parts by weight, most preferably from 3 to 20 parts by weight, based on 100 parts by weight of the colored substrate particles. Coating amount of the polymer if too small would bear no sufficient adhesive property, while the amount if too large would cause agglomeration of the colored substrate particles and entail problems such as reduced luster of the painted surface, generation of seeds and the like.

The coating polymer may be synthesized for example from the following polymerizable monomers: acrylic acid, methacrylic acid, methyl methacrylate, butyl acrylate, 2-ethylhexyl acrylate, lauryl acrylate, stearyl acrylate, cyclohexyl acrylate, 2-hydroxyethyl acrylate, 2-hydroxybutyl acrylate, 2-methoxyethyl acrylate, 2-diethylaminoethyl acrylate, butyl methacrylate, octyl methacrylate, 1,4-butanediol diacrylate, 1,6-hexanediol diacrylate, 1,9-nonanediol diacrylate, neopentyl glycol diacrylate, tripropylene glycol diacrylate, tetraethylene glycol diacrylate, trimethylolpropane triacrylate, tetramethylolmethane tetraacrylate, pentaerythritol triacrylate, trisacryloxyethyl phosphate, ditrimethylolpropane tetraacrylate, styrene, α-methylstyrene, vinyltoluene, divinylbenzene, acrylonitrile, methacrylonitrile, vinyl acetate, vinyl propionate, maleic acid, crotonic acid, itaconic acid, polybutadiene, linseed oil, soybean oil, epoxidated soybean oil, epoxidated polybutadiene, cyclohexenevinyl monoxide and divyinylbenzene monoxide.

In order to improve solvent resistance of the colored substrate particles more efficiently, it is desirable that the thus polymer-coated colored substrate particles are further covered with a coating layer composed of a silane or titanium coupling agent. Such a coating layer is effective in preventing elution of the resin into the solvent and further improving adhesion of the pigment. Examples of the silane coupling agent to be used in the present invention include N-β-(aminoethyl)-γ-aminopropyltrimethoxysilane, γ-aminopropyltriethoxysilane, γ-ureidopropyltriethoxysilane and N-β-(aminoethyl)-β-aminopropylmethyldimethoxysilane. Also, examples of the titanium coupling agent include isopropyltri(N-aminoethyl-aminoethyl) titanate and dibutoxybistriethanolamine titanate.

Preferably, treatment of the polymer-coated colored substrate particles with the coupling agent may be effected by a method in which the coupling agent and if necessary water are added to a dispersion of the polymer-coated colored substrate particles in a solvent such as a hydrocarbon and an alcohol and the mixture is heated with stirring to effect hydrolysis, thereby effecting precipitation and adhesion of the coupling agent to the polymer-coated colored substrate particles, or by a method in which the coupling agent is added during a kneading step of a paste composed of the polymer-coated colored substrate particles and a nonpolar solvent. It seems that the thus treated polymer-coated colored substrate particles are coated in a mode in which the silane coupling agent or titanium coupling agent is hydrolyzed and condensed.

A third aspect of the present invention is a production process of colored substrate particles.

The production process of colored substrate particles of the present invention comprises the following steps of:

a. preparing a dispersion of a surface-treated color pigment by dispersing a color pigment in a nonpolar solvent, in the presence of a surface-treatment agent and optionally a chelate compound, thereby forming a coat layer of the surface-treatment agent or a coat layer of the surface-treatment agent and the chelate compound, and b. mixing the dispersion of surface-treated color pigment of the step "a" with substrate particles, thereby effecting adhesion of said surface-treated color pigment to the surface of said substrate particles.

In this case, the surface-treated color pigment is adhered to the substrate particles almost entirely and hardly remains in the solvent. Dispersion of the surface-treated color pigment may be effected preferably by a method in which a ball mill, beads mill, sand mill or other grinding medium is used. Dispersion after the addition of substrate particles may be effected by the just described grinding medium-aided method or by agitation with a stirrer or a disper. Also useful is a method in which the dispersion after the addition of the substrate particles is made into a paste by subjecting it to solid-liquid separation and then kneaded using a kneader mixer or other means.

As the nonpolar solvent to be used in the present invention, an aliphatic hydrocarbon, an aromatic hydrocarbon or a mixture thereof having a boiling point of approximately from 100 to 250° C. may be preferable. Its illustrative examples include normal paraffin, isoparaffin, toluene, xylene, solvent naphtha, kerosene, mineral spirit and petroleum benzine. As occasion demands, an alcohol or ester group solvent may be added in a small amount (approximately 5% or less) as an auxiliary solvent for the pigment dispersion.

If desired, the aforementioned process of the present invention further includes the step "c" of adding the polymerizable monomer and an initiator (benzoyl peroxide, isobutyl peroxide or azobisisobutyronitrile) to a dispersion of colored substrate particles in a solvent such as hydrocarbon or alcohol (preferably a hydrocarbon), and heating the mixture with stirring, thereby effecting in-situ polymerization of the polymerizable monomer and subsequent precipitation of the thus synthesized polymer on the surface of the colored substrate particles.

As the dispersion of colored substrate particles, a dispersion obtained in the adhesion step of the surface-treated color pigment to the substrate particles may be used as it is. Alternatively, a dispersion obtained by once subjecting said dispersion to solid-liquid separation and again dispersing the resulting paste- or powder-like colored substrate particles in a solvent can be used. It is desirable to carry out the polymerization reaction in an oxygen-free atmosphere, for example in an inert atmosphere of nitrogen or argon gas. The reaction may be carried out at a temperature of preferably from 50 to 150° C., more preferably from 70 to 100° C. The reaction temperature if too low would bear no efficient polymerization reaction and if too high would entail no precipitation of the resin on the surface of colored substrate particles due to quick reaction. Preferably, the reaction may be carried out for approximately 0.5 to 24 hours. The reaction time if too short would not bear sufficient polymerization of the monomer and if exceeding 24 hours would bear no particular merit.

After completion of the polymerization reaction, the dispersion is made into a paste by removing the greater part of the solvent therefrom using a filtration apparatus. The thus obtained paste-like colored substrate particles can be used as it is when used in general paints. As the filtration apparatus, a filter press, a pan filter or the like may be used.

A fourth aspect of the present invention is a resin composition in which the colored substrate particles are blended with paint, ink or resin moldings. The term "resin composition" as used herein includes paints and paint films thereof, ink and printed matters thereof and resin moldings and pellets to be used as their starting materials. Blending amount of the colored substrate particles when used in a resin composition is preferably 0.1 to 30% by weight, more preferably 1 to 20% by weight, based on the composition. Blending amount of the colored substrate particles if too small would bear no sufficient decorative effect and if too large would spoil weathering resistance, corrosion resistance, mechanical strength and other physical properties of the resin composition. Paints and ink are composed of the following components:

1) resin: acryl, alkyd, polyester, polyurethane, polyvinyl acetate, nitrocellulose, fluorocarbon resins,
2) pigment: in addition to colored substrate particles of the present invention, color pigments, extenders or dyestuffs such as phthalocyanine, quinacridone, isoindolinone, perylene, azo rake, iron oxide, chrome yellow, carbon black, titanium oxide and pearl mica may be used, and
3) additives: a solvent, a surface active agent, a hardening agent, a UV absorbent, a static eliminating agent, a thickener and the like.

Resin moldings are composed of the following components:

1) resin: polyethylene, polypropylene, polybutadiene, polycarbonate, ABS, polyvinyl chloride,
2) pigment: in addition to colored substrate particles of the present invention, color pigments, extenders or dyestuffs such as phthalocyanine, quinacridone, isoindolinone, perylene, azo rake, iron oxide, chrome yellow, carbon black, titanium oxide and pearl mica may be used, and
3) additives: a coupling agent, a plasticizer, a hardening agent and the like.

A fifth aspect of the present invention is powder coatings in which the polymer-coated colored metallic particles are blended with paint resin powders.

When the surface of the colored metallic particles is coated with a polymer, an electrical insulating layer is formed on the surface of the colored metallic particles, and the thus formed layer prevents leakage of an electric current mediated by the metallic particles during electrostatic powder coating and increases transfer efficiency. It is desirable that the colored metallic particles for powder coating has a withstand voltage of 80 kV or more. When the withstand voltage is less than 80 kV, sufficient electrification of the colored metallic particles cannot be effected at the time of its coating using an electrostatic powder coating machine, so that the amount of the colored metallic particles adhered to a base material becomes small as the result and metallic touch of the thus obtained paint film becomes poor. The withstand voltage of 80 kV or more can be achieved generally by using the coating polymer in an amount of 3 parts by weight or more based on 100 parts by weight of the colored metallic particles, but the amount may be less than 3 parts by weight depending on the grain size or surface conditions of the substrate metallic particles, kinds of the color pigment to be adhered and kinds of the polymerizable monomer.

The amount of residual solvent in the colored metallic particles for powder coating of the present invention may be controlled at a level of preferably 5% by weight or less, more preferably 2% by weight or less. Examples of the residual solvent include hydrocarbon solvents which are used when milling of a substrate metallic particles or in situ polymerization of a polymerizable monomer is carried out and solvents of alcohol, ester, ketone and the like systems which are used when a color pigment is dispersed. Amount of the residual solvent exceeding 5% by weight will cause agglomeration of a colored metallic particles when the colored metallic particles is mixed with paint resin powder, thus entailing not only uneven mixing but also another problem in that the resulting powder coating apts to block a pipe or the like for use in its conveyance due to its poor flow.

In order to control the amount of residual solvent in the colored metallic particles for powder coating, a paste-like colored metallic particles are made into a powder form having a solvent content of 5% by weight or less, preferably 2% by weight or less, by further removing the solvent through mixing and heating (50 to 150° C.) the paste-like colored metallic particles under a reduced pressure (less than atmospheric pressure). For the mixing while heating under a reduced pressure, a vacuum kneader mixer and a vacuum dryer may be effective. Since this step is carried out under a reduced pressure, it is safer than a spray drying method.

Though the conventional metallic paint has a problem of causing agglomeration due to reaction of additive agents including oleic acid when made into powder, the production process of the present invention hardly cause agglomeration because of the encapsulation of each metallic particle with a polymer. In consequence, a smooth paint film having no seeds can be obtained when subjected to powder coating. Coating amount of the polymer effective in preventing agglomeration is merely 0.5 part by weight or more per 100 parts by weight of the colored metallic particles.

When the polymer-coated colored metallic particles of the present invention are used in powder coatings, two or more kinds of the colored metallic pigment may be formulated, and a special type of powder coating paint film having a polychroismic effect in which colors change according to the looking directions can be obtained by the use of two or more pigments.

Typical formulation method of powder coatings is divided into a melt blend method in which a melted paint resin is kneaded with a pigment to effect dispersion and then disintegrated to obtain a powder-coating and a dry blend method in which a paint resin is disintegrated and then dry-blended with a pigment to obtain a powder coating, and the colored metallic particles of the present invention is best suited for the dry blend powder coating. The melt blend method is not preferable, because deformation and breakage of flake powder occur during the step for kneading and disintegrating the colored metallic particles. Appropriate amount of the colored metallic particles to be blended may be within the range of from 0.1 to 30 parts by weight, preferably from 1 to 20 parts by weight, based on 100 parts by weight of paint resin powder. The amount if too small would not bear sufficient decorative effect and if too large would exert bad influence upon physical properties (weathering resistance, corrosion resistance, mechanical strength and the like) of the powder coating paint film.

Illustrative examples of the paint resin powder to be used in the present invention include acrylic resin, alkyd resin, polyester resin, polyurethane resin, polyvinyl acetate resin, polyvinyl chloride resin, epoxy resin, nitrocellulose resin and fluorocarbon resin.

The paint resin powder may have an approximate particle size of preferably from about 1 to 100 $\mu$m. The particle size if too small would cause frequent generation of dust and agglomeration and if too large would cause frequent generation of mottled colors.

The paint resin powder may be blended with the following components:
1) pigments and dyestuffs: colored pigments such as phthalocyanine, quinacridone, isoindolinone, perylene, azo rake, iron oxide, chrome yellow, carbon black, titanium oxide and pearl mica; extenders such as bentonite, alumina white and calcium carbonate; and oil soluble dyestuffs, and
2) additives: a stabilizer, a surface active agent, a hardening agent, a UV absorbent, a leveling agent, a thickener and the like.

A fluidized bed coating or an electrostatic powder coating can be employed as a coating method of the powder coating, of which the electrostatic powder coating is more preferred because of its excellent transfer efficiency. The electrostatic powder coating is effected by corona electrical charging or frictional electrification, and both of such coating systems can be used.

A sixth aspect of the present invention is a paint composition having an excellent paint film appearances.

By selecting flaky metallic particles having a maximum particle size of 50 $\mu$m or less, an average particle size of 5 to 35 $\mu$m and an average thickness of 2 $\mu$m or less among the polymer-coated colored metallic particles, the resulting paint film has excellent appearances. The polymer-coated metallic particles are as produced according to the aforementioned method.

Similar effect can be obtained by using a flaky metallic particles colored by forming a light coherent oxide film on each particle surface as long as maixmum particle size, average particle size and average thickness thereof are within the aforemenetioned ranges. In this case, metal flakes such as of aluminum, zinc, copper, bronze, nickel, titanium and stainless steel may be used as metallic particles. Of these metal flakes, titanium flakes and stainless steel flakes are particularly preferred, because interference color can be obtained easily due to high refraction index of the oxide film.

Though not particularly limited, formation of a light coherent oxide film on the surface of metal flakes may be effected preferably by a method in which an air oxidized film is formed on the surface of the metal flakes by heating the pigment at about 300 to 700° C. in an oxygen level-controlled atmosphere or by a method in which the flaky metallic pigment is coated with an oxide precursor such as of a transient metal or the like and then heat decomposition is carried out.

It is desirable to obtain an excellent paint film appearances that the colored flaky metallic particles has a maximum particle size of 50 $\mu$m or less, an average particle size of 5 to 35 $\mu$m and an average thickness of 2 $\mu$m or less. The maximum particle size if larger than 50 $\mu$m would cause protrusion of the flaky colored metallic pigment on the surface of the resulting paint film, thereby spoiling smoothness or clearness of the painted surface. The average particle size if larger than 35 $\mu$m or the average thickness if larger than 2 $\mu$m would cause the same problem. The average particle size if smaller than 5 $\mu$m would not bear sufficient metallic touch or bright touch.

Average particle size of the colored flaky metallic particles can be obtained by calculating mass average from the particle size distribution measured by a known particle size distribution measuring method such as a laser diffraction method, a micromesh sieve method, a coulter counter method or the like. Average thickness is calculated from hinding power and density of the flaky metallic particles. Maximum particle size is decided based on the minimum opening of sieve by which the residue on sieve measured by a sieving method becomes 0.1% or less.

By the use of at least one colored flaky metallic particle of the present invention, a paint composition can be obtained which provides a metallic coating paint film having characteristic appearances such as brightness of color, clearness, anisotropy of color and the like. In order to obtain a paint film having anisotropy of color, it is more desirable to mix two or more kinds of the colored flaky metallic particles of the present invention.

Appropriate amount of the colored flaky metallic particles of the present invention to be blended may be within the range of from 0.1 to 30 parts by weight, preferably from 1 to 20 parts by weight, based on 100 parts by weight of the resin content of the paint composition. The amount if too small would not bear sufficient decorative effect and if too large would exert adverse effect upon physical properties (smoothness of the surface, weathering resistance, corrosion resistance, mechanical strength and the like) of the metallic coating paint film.

In addition to the colored flaky metallic particles of the present invention, a color pigment or mica may be added to the paint composition of the present invention. By the addition of such pigments, more bright metallic coating paint film or a metallic coating paint film having more remarkable anisotropy can be obtained. Though blending amounts of these pigments vary depending on their kinds, it is desirable to use them in such amounts that they do not spoil characteristics of the flaky colored metallic pigment of the present invention and smoothness or clearness of the paint film surface.

The following can be recited as illustrative examples of the color pigment or mica to be added.

(Color pigment)
Phthalocyanine, halogenated phthalocyanine, quinacridone, diketopyrrolopyrrole, isoindolinone, azomethine metal complex, indanthrone, perylene, perynone, anthraquinone, dioxazine, benzoimidazolone, condensed azo, triphenylmethane, quinophthalone, anthrapyrimidine, titanium oxide, iron oxide and carbon black.

(Mica)
Transparent pearl mica, colored mica and coherent mica.

Illustrative examples of resin components to be used in the paint composition of the present invention include acrylic resin, melamine resin, alkyd resin, polyester resin, polyurethane resin, polyvinyl acetate resin, polyvinyl chloride resin, epoxy resin, cellulose resin and fluorocarbon resin. These resins may be used alone or as a mixture and may be either a thermosetting type or a air drying type.

As occasion demands, the paint composition of the present invention may be further blended with additive agents such as a solvent, a stabilizer, a pigment dispersing agent, a sedimentation preventing agent, a hardening agent, a UV absorbent, a leveling agent, an antifoaming agent, a thickener, an extender and the like.

Though not particularly limited, production of the paint composition of the present invention may be effected generally by a method in which the flaky colored metallic pigment of the present invention is added to a resin varnish blended with pigments and additive agents, and the resulting mixture is mixed with stirring.

The present invention also relates to a method for the formation of paint film which comprises forming a colored base coat layer on a substrate to which electro deposition and under coating or intermediate coating are applied using the paint composition of the present invention, and subsequently forming a clear coat layer on said colored base coat layer.

A steel plate is general as the substrate, but an aluminum plate, a plastic plate or the like may also be used. In order to add adhesive property or corrosion resistance to the paint film, it is desirable to subject the substrate to electro deposition and under coating or intermediate coating. The electro deposition, under coating and intermediate coating are not particularly limited and can be effected by known methods.

The paint composition of the present invention is coated on the thus prepared substrate to form a colored base coat layer. The coating method is not particularly limited and can be effected for example by air spray coating, airless spary coating, electrostatic coating, electrostatic powder coating, roll coating or the like.

Hard dried film of the colored base coat layer may have an approximate thickness of from 5 to 50 μm, preferably from 10 to 20 μm.

By forming a clear coat layer on the colored base coat layer prepared making use of the paint composition of the present invention, a paint film having excellent surface smoothness or clearness can be formed. The clear coat layer may be coated either by a two coat-one bake method in which the clear coat layer is coated prior to the hardening of the colored base coat layer and baked together with the colored base coat layer or by a two coat-two bake method in which the clear coat layer is coated after baking of the colored base coat layer and again baked. Illustrative examples of components of the paint composition to be used in the clear coat layer are as follows.

1) Acrylic resin, melamine resin, alkyd resin, polyester resin, polyurethane resin, polyvinyl acetate resin, polyvinyl chloride resin, epoxy resin, cellulose resin, fluorocarbon resin and the like resins, and
2) a solvent, a stabilizer, a pigment dispersing agent, a sedimentation preventing agent, a hardening agent, a UV absorbent, a leveling agent, an antifoaming agent, a thickener, a pigment and the like additive agents.

Preferably, hard dried film of the clear coat layer may have a thickness of about 20 to 60 μm.

EFFECT OF THE INVENTION

Since a color pigment can be adhered finely and uniformly to substrate particles when the surface-treated pigment of the present invention is used, substrate particles having excellent chroma can be obtained. In addition, when the colored substrate particles are further coated with a polymer synthesized from a polymerizable monomer or with said polymer and a coupling agent, the color pigment is fixed on the substrate particles so that adhesive property of the pigment can be improved.

Since applicable range of color pigments is broad in the present invention, colored substrate particles having all the colors can be obtained.

The present invention can be applied to broad range of fields as a method to adhere fine particles uniformly and efficiently to the surface of substrate particles having a relatively large particle size.

By using the paint composition of the present invention comprising the polymer-coated colored flaky metallic particles having specific particle size and thickness, a metallic coating paint film having excellent chroma and surface smoothness can be obtained. The coating paint film which shows anisotropy of conspicuous color can be obtained.

When a powder coating is prepared making use of the colored metallic particles for powder coating of the present invention, the following effects can be obtained.

A powder coating paint film having excellent chroma can be obtained.

Since the colored metallic particles for powder coating of the present invention hardly causes agglomeration, a smooth powder coating paint film having no seeds can be obtained.

Since the surface of the colored metallic pigment for powder coating of the present invention is coated with a polymer which is synthesized from a polymerizable monomer, leakage of an electric current mediated by the metallic pigment during electrostatic powder coating can be prevented and good transfer efficiency can be obtained.

Since applicable range of color pigments is broad according to the present invention, all types of colors can be obtained.

According to the production process of the present invention, almost all portion of the added color pigment can be adsorbed by the metallic particles so that stable quality can be obtained.

By blending two or more kinds of the colored metallic particles for powder coating of the present invention, a powder coating paint film having a special polychroismic effect in which colors change depending on the looking directions can also be obtained.

EXAMPLES

Example 1-1

A 1 g portion of a commercially available diketopyrrolopyrrole based red pigment (IRGAZIN DPP RED BO, manufactured by Ciba-Geigy Japan) was mixed with 0.5 g (50 parts by weight based on 100 parts by weight of the pigment) of benzoic acid and 10 g of mineral spirit, and the mixture was subjected to 24 hours of ball mill dispersion using a pot mill of 5 cm in diameter and 300 cc in internal volume which has been charged with 200 g of glass beads of 1 mm in diameter. Thereafter, the pot mill was supplemented with 11.4 g (10 g as metal content) of a commercially available aluminum paste (MG 1000, manufactured by Toyo Aluminium; metal content, 70%; average particle size, 30 µm; average thickness, 1 µm; specific surface area, 1.4 $m^2/g$) and 20 g of mineral spirit, and the ball mill dispersion was carried out for additional 1 hour. When the thus obtained slurry was washed with 70 g of mineral spirit to separate it from glass beads and then allowed to stand for a while to effect precipitation of aluminum flakes, the resulting supernatant of the slurry became transparent. When the solvent was removed from the slurry and the aluminum flakes were observed under an optical microscope, the red pigment was adhered to each aluminum flake. Amount of the pigment adhered to the aluminum flakes was found to be 0.07 $g/m^2$.

Example 1-2

The red pigment was adhered to aluminum flakes by repeating the procedure of Example 1-1, except that 0.1 g (10 parts by weight based on 100 parts by weight of the pigment) of dialkoxyaluminum alkylacetoacetate (Plain Act ALM, manufactured by Ajinomoto) was added as a chelate compound in addition to benzoic acid. When the thus obtained aluminum flakes were observed under an optical microscope, the red pigment was adhered uniformly to each aluminum flake. As shown in FIG. 1, a scanning electron microphotograph of the aluminum flakes showed finely and uniformly adhered red pigment on the flake surface.

Examples 1-3 to 1-12 and Comparative Examples 1-1 to 1-5

Colored substrate particles of Examples 1-3 to 1-12 and Comparative Examples 1-1 to 1-5 were prepared by repeating the procedure of Example 1-1, except that kinds and amounts of the monobasic aromatic carboxylic acid and those of the chelate compound were changed as shown in Table 1-1.

Table 1-1 also shows results of a five-rank evaluation of adhesion conditions of pigments observed under an optical microscope and a scanning electron microscope. In the table, amounts of the monobasic aromatic carboxylic acid and chelate compound are parts by weight based on 100 parts by weight of substrate particles.

(Evaluation of adhesion condition of pigment)

5: good dispersion of pigment and uniform adhesion of pigment to the entire surface of each flake 4: adhesion of pigment to the entire surface of each flake, but not uniform 3: insular adhesion of pigment to each flake 2: mixture of pigment-adhered flakes and non-adhered flakes 1: no adhesion of pigment

Examples 1-13 to 1-24 and Comparative Examples 1-6 and 1-7

Colored substrate particles of Examples 1-13 to 1-24 and Comparative Examples 1-6 and 1-7 were prepared by repeating the procedure of Example 1-2, except that kinds of the substrate particles and kinds and amounts of color pigments were changed. Table 1-2 shows preparation conditions of these pigments and their adhesion conditions. In the table, amounts of the added pigments are parts by weight based on 100 parts by weight of substrate particles.

Example 1-25

The slurry of Example 1-2 containing 10 g of colored substrate particles was mixed with 0.25 g of methyl methacrylate, 0.25 g of 1,6-hexanediol diacrylate, 0.25 g of styrene and 0.25 g of acrylic acid (total: 10 parts by weight of monomers based on 100 parts by weight of the colored substrate particles), and the mixture was heated at 80° C. with stirring in an atmosphere of nitrogen to carry out 12 hours of reaction by adding 0.05 g of azobisisobutyronitrile as an initiator, thereby effecting polymerization of the monomers and precipitation of the resulting polymer on the surface of the colored substrate particles. After the treatment, the resulting slurry was subjected to solid-liquid separation to make it into a paste of 50% in solid content.

Example 1-26

The slurry of Example 1-4 containing 10 g of colored substrate particles was mixed with 0.5 g of acrylic acid, 0.5 g of ditrimethylolpropane tetraacrylate, 0.5 g of diethylaminoethyl methacrylate and 0.5 g of vinyltoluene (total: 20 parts by weight of monomers based on 100 parts by weight of the colored substrate particles), and the mixture was heated at 80° C. with stirring in an atmosphere of nitrogen to carry out polymerization of the monomers by adding 0.1 g of azobisisobutyronitrile as an initiator, thereby effecting precipitation of the resulting polymer on the surface of the colored substrate particles. After the treatment, the resulting slurry was subjected to solid-liquid separation to make it into a paste of 50% in solid content.

Example 1-27

The slurry of Example 1-17 containing 10 g of colored substrate particles was mixed with 1.0 g of methacrylic acid, 1.0 g of trimethylolpropane triacrylate, 1.0 g of butyl acrylate and 1.0 g of divinylbenzene (total: 40 parts by weight of monomers based on 100 parts by weight of the colored substrate particles), and the mixture was heated at 80° C. with stirring in an atmosphere of nitrogen to carry out polymerization of the monomers by adding 0.3 g of benzoyl peroxide as an initiator, thereby effecting precipitation of the resulting polymer on the surface of the colored substrate particles. After the treatment, the resulting slurry was subjected to solid-liquid separation to make it into a paste of 50% in solid content.

Example 1-28

The slurry of Example 1-13 containing 10 g of colored substrate particles was mixed with 0.3 g of acrylic acid, 0.3 g of ditrimethylolpropane tetraacrylate, 0.3 g of glycidyl methacrylate and 0.3 g of styrene (total: 12 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the colored substrate particles. Thereafter, the thus obtained slurry was mixed with 0.1 g (1 part by weight based on 100 parts by weight of the colored substrate particles) of N-β-(aminoethyl)-γ-aminopropyltrimethoxysilane to carry out additional 1 hour of reaction in the air. After the treatment, the resulting slurry was subjected to solid-liquid separation to make it into a paste of 50% in solid content.

Example 1-29

A 16 g portion of the colored substrate particles of Example 1-26 were mixed with 0.08 g (1 part by weight based on 100 parts by weight of the colored substrate particles) of dibutoxyistriethanolamine titanate and 1 g of butyl alcohol.

Comparative Example 1-8

A slurry was prepared by dispersing 10 g (as metal content) of substrate particles (MG 1000, manufactured by Toyo Aluminium) and 1.0 g of a diketopyrrolopyrrole based red pigment (IRGAZIN DPP RED BO, manufactured by Ciba-Geigy Japan) in 100 ml of mineral spirit. The thus prepared slurry was mixed with 0.25 g of methyl methacrylate, 0.25 g of 1,6-hexanediol diacrylate, 0.25 g of styrene and 0.25 g of acrylic acid (total: 10 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the substrate particles together with the pigment. After the treatment, the resulting slurry was subjected to solid-liquid separation to make it into a paste of 50% in solid content.

Comparative Example 1-9

A slurry containing 10 g of substrate particles prepared in the same manner as described in Example 1-2, except that amount of the added chelate compound (dialkoxyaluminum alkylacetoacetate) was changed to 0.6 g, was mixed with 0.3 g of acrylic acid, 0.3 g of ditrimethylolpropane tetraacrylate, 0.3 g of glycidyl methacrylate and 0.3 g of styrene (total: 12 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the colored substrate particles. After the treatment, the resulting slurry was subjected to solid-liquid separation to make it into a paste of 50% in solid content.

Comparative Example 1-10

A slurry containing 10 g of colored substrate particles prepared in the same manner as described in Example 1-2, except that amount of the added monobasic aromatic carboxylic acid (benzoic acid) was changed to 1.2 g (120 parts by weight based on 100 parts by weight of the color pigment), was mixed with 0.3 g of acrylic acid, 0.3 g of ditrimethylolpropane tetraacrylate, 0.3 g of glycidyl methacrylate and 0.3 g of styrene (total: 12 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the colored substrate particles. After the treatment, the resulting slurry was subjected to solid-liquid separation to make it into a paste of 50% in solid content.

(Test 1-1)

On the color tones of the colored substrate particles obtained in Examples 1-25 to 1-29 and Comparative Examples 1-8 to 1-10, chroma and metallic luster of plates coated with paints which have been prepared using these pigments were evaluated with the naked eye by a five-rank evaluation system.

The paints were prepared by mixing 10 parts by weight of respective colored substrate particles with 100 parts by weight of a varnish for automobile repairing use (Auto Clear, manufactured by Nippon Paint) and dispersing them using a disper. Each of the thus prepared paints was coated on a sheet of duplex art paper using a doctor blade of 225 μm (9 mill) to prepare coated plates.

In this case, similar test was carried out on commercially available colored substrate particles.
(Evaluation of chroma)
  5: very good
  4: good
  3: mediocre
  2: bad
  1: no coloring
(Evaluation of luster)
  5: very good
  4: good
  3: mediocre
  2: bad
  1: no luster
(Evaluation of solvent resistance)
  ○: colorless, transparent supernatant
  Δ: transparent but lightly colored supernatant
  ×: opaque or deeply colored supernatant
(Test 1-2)

A 0.3 g portion of each of the colored substrate particles obtained in Examples 1-25 to 1-29 and Comparative Examples 1-8 to 1-10 was dispersed in 30 g of each of four solvents, namely toluene, isopropyl alcohol, ethyl acetate and methyl ethyl ketone, using a disper at 3,200 rpm for 3 minutes, the thus obtained dispersion was allowed to stand for 24 hours and then the resulting supernatant was observed to evaluate degree of the pigment fall off.

In this case, similar test was carried out on commercially available colored substrate particles.

Results of the Tests 1-1 and 1-2 are shown in Table 1-3.

Example 1-30

A 20 g portion of the colored substrate particles obtained in Example 1-26 were mixed with 80 g of a commercially available thermosetting acrylic resin varnish (Acrydic A-322, manufactured by Dainippon Ink & Chemicals) and 17 g of a melamine resin varnish (Super Beckamine L-117-60, manufactured by Dainippon Ink & Chemicals) and dispersed using a disper to prepare a red metallic paint. The thus prepared metallic paint was diluted with 100 g of a thinner (ethyl acetate:butyl acetate:xylene:cellosolve acetate:solvesso #100=15:6:20:9:12) and coated on a mild steel plate using an air spray, and the resulting coat layer was further air spray-coated with a clear paint consisting of 56 g of a commercially available thermosetting acrylic resin varnish (Acrydic A-345, manufactured by Dainippon Ink & Chemicals), 22 g of a melamine resin varnish (Super Beckamine L-117-60, manufactured by Dainippon Ink & Chemicals) and 70 g of a thinner (the just described composition). The thus coated plate was baked at 140° C. to obtain a two coat-one bake metallic paint film. The thus obtained paint film showed a bright red color and excellent metallic luster.

Comparative Example 1-11

A metallic paint was prepared in the same manner as described in Example 1-27, except that 14.3 g of colored substrate particles (solid content, 70%) prepared under the same conditions of Comparative Example 1-2 were used as the pigment, and a two coat-one bake metallic paint film was obtained in the same manner. The thus obtained paint film was inferior to the paint film obtained in Example 1-27 in terms of the brightness of color.

Example 1-31

A 100 g portion of polyethylene resin was blended with 3 g (as aluminum content) of the colored substrate particles obtained in Example 1-26 to prepare a molded product by injection molding. The thus molded product showed a bright red metallic appearance.

Comparative Example 1-12

A molded product was prepared in the same manner as described in Example 1-23, except that 3 g (as aluminum content) of the substrate particles obtained in Comparative Example 1-2 were used as the pigment. The thus molded product showed a metallic appearance but the color was not so bright.

Example 2-1

A 1 g portion of a commercially available phthalocyanine based blue pigment (HELIOGEN BLUE L6900, manufactured by BASF Japan) was mixed with 0.5 g (50 parts by weight based on 100 parts by weight of the pigment) of N-β-(aminoethyl)-γ-aminopropylmethyldimethoxysilane and 10 g of mineral spirit, and the mixture was subjected to 24 hours of ball mill dispersion using a pot mill of 5 cm in diameter and 300 cc in internal volume which has been charged with 200 g of glass beads of 1 mm in diameter. Thereafter, the pot mill was supplemented with 11.4 g (10 g as metal content) of a commercially available aluminum paste (MG 1000, manufactured by Toyo Aluminium; metal content, 70%; average particle size, 30 µm; average thickness, 1 µm; specific surface area, 1.4 m$^2$/g) and 20 g of mineral spirit, and the ball mill dispersion was carried out for additional 1 hour. when the thus obtained slurry was washed with 70 g of mineral spirit to separate it from glass beads and then allowed to stand for a while to effect precipitation of aluminum flakes, the resulting supernatant of the slurry became transparent. When the solvent was removed from the slurry and the aluminum flakes were observed under an optical microscope, the blue pigment was adhered to each aluminum flake. Amount of the pigment adhered to the aluminum flakes was found to be 0.07 g/m$^2$.

Examples 2-2

The blue pigment was adhered to aluminum flakes by repeating the procedure of Example 2-1, except that 0.1 g (10 parts by weight based on 100 parts by weight of the pigment) of dialkoxyaluminum alkylacetoacetate (Alumi Chelate M, manufactured by Ajinomoto) was added as a chelate compound in addition to N-β-(aminoethyl)-γ-aminopropylmethyldimethoxysilane. When the thus obtained aluminum flakes were observed under an optical microscope, the blue pigment was adhered uniformly to each aluminum flake.

Examples 2-3 to 2-10 and Comparative Examples 2-1 to 2-5

Colored substrate particles of Examples 2-3 to 2-10 and Comparative Examples 2-1 to 2-5 were prepared by repeating the procedure of Example 2-1, except that kinds and amounts of the amino compound having two amino groups in its molecule and not having carboxyl group and those of the chelate compound were changed as shown in Table 1. This table also shows results of a five-rank evaluation of the adhesion condition of pigments observed under an optical microscope and a scanning electron microscope, carried out on the basis of the aforementioned evaluation criteria. In the table, amounts of the amino compound and chelate compound are parts by weight based on 100 parts by weight of substrate particles.

Examples 2-11 to 2-21 and Comparative Examples 2-6 and 2-7

Colored substrate particles of Examples 2-11 to 2-21 and Comparative Examples 2-6 and 2-7 were prepared by repeating the procedure of Example 2-2, except that kinds of the substrate particles and kinds and amounts of color pigments were changed. Table 2-2 shows preparation conditions of these pigments and their adhesion conditions examined by the just described five-rank evaluation method. In the table, amounts of the added pigments are parts by weight based on 100 parts by weight of substrate particles.

Example 2-22

The slurry of Example 2-2 containing 10 g of colored substrate particles was mixed with 0.25 g of methyl methacrylate, 0.25 g of 1,6-hexanediol diacrylate, 0.25 g of styrene and 0.25 g of acrylic acid (total: 10 parts by weight of monomers based on 100 parts by weight of the colored substrate particles), and the mixture was heated at 80° C. with stirring in an atmosphere of nitrogen to carry out 12 hours of reaction by adding 0.05 g of azobisisobutyronitrile as an initiator, thereby effecting polymerization of the monomers and precipitation of the resulting polymer on the surface of the colored substrate particles. After the treatment, the resulting slurry was subjected to solid-liquid separation to make it into a paste of 50% in solid content.

Example 2-23

The slurry of Example 2-4 containing 10 g of colored substrate particles was mixed with 0.5 g of acrylic acid, 0.5 g of ditrimethylolpropane tetraacrylate, 0.5 g of diethylaminoethyl methacrylate and 0.5 g of vinyltoluene (total: 20 parts by weight of monomers based on 100 parts by weight of the colored substrate particles), and the mixture was heated at 80° C. with stirring in an atmosphere of nitrogen to carry out polymerization of the monomers by adding 0.1 g of azobisisobutyronitrile as an initiator, thereby effecting precipitation of the resulting polymer on the surface of the colored substrate particles. After the treatment, the resulting slurry was subjected to solid-liquid separation to make it into a paste of 50% in solid content.

Example 2-24

The slurry of Example 2-14 containing 10 g of colored substrate particles was mixed with 1.0 g of methacrylic acid, 1.0 g of trimethylolpropane triacrylate, 1.0 g of butyl acrylate and 1.0 g of divinylbenzene (total: 40 parts by weight of monomers based on 100 parts by weight of the colored substrate particles), and the mixture was heated at 80° C. with stirring in an atmosphere of nitrogen to carry out polymerization of the monomers by adding 0.3 g of benzoyl peroxide as an initiator, thereby effecting precipitation of the resulting polymer on the surface of the colored substrate particles. After the treatment, the resulting slurry was subjected to solid-liquid separation to make it into a paste of 50% in solid content.

Example 2-25

The slurry of Example 2-11 containing 10 g of colored substrate particles was mixed with 0.15 g of acrylic acid, 0.15 g of ditrimethylolpropane tetraacrylate, 0.15 g of glycidyl methacrylate and 0.15 g of styrene (total: 6 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the colored substrate particles. After the treatment, the resulting slurry was subjected to solid-liquid separation to make it into a paste of 50% in solid content.

Example 2-26

The slurry of Example 2-17 containing 10 g of colored substrate particles was mixed with 0.2 g of methyl methacrylate, 0.2 g of ditrimethylolpropane triacrylate, 0.2 g of butyl acrylate and 0.2 g of styrene (total: 8 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the colored substrate particles. After the treatment, the resulting slurry was subjected to solid-liquid separation to make it into a paste of 60% in solid content. Thereafter, to the thus obtained resin-coated colored substrate particles in the form of slurry were added 0.1 g of γ-aminopropyltrimethoxysilane (1 part by weight based on 100 parts by weight of the colored substrate particles) and 1 g of-butyl alcohol.

Comparative Example 2-8

A slurry was prepared by dispersing 10 g (as metal content) of substrate particles (MG 1000, manufactured by Toyo Aluminium) and 1.0 g of a phthalocyanine blue based pigment (HELIOGEN BLUE L6900, manufactured by BASF Japan) in 100 ml of mineral spirit. The thus prepared slurry was mixed with 0.25 g of methyl methacrylate, 0.25 g of 1,6-hexanediol diacrylate, 0.25 g of styrene and 0.25 g of acrylic acid (total: 10 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the substrate particles together with the pigment. After the treatment, the resulting slurry was subjected to solid-liquid separation to make it into a paste of 50% in solid content.

Comparative Example 2-9

A slurry containing 10 g of substrate particles prepared in the same manner as described in Example 2-2, except that amount of the added chelate compound (dialkoxyaluminum alkylacetoacetate) was changed to 0.6 g, was mixed with 0.3 g of acrylic acid, 0.3 g of ditrimethylolpropane tetraacrylate, 0.3 g of glycidyl methacrylate and 0.3 g of styrene (total: 12 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the colored substrate particles. After the treatment, the resulting slurry was subjected to solid-liquid separation to make it into a paste of 50% in solid content.

Comparative Example 2-10

A slurry containing 10 g of colored substrate particles prepared in the same manner as described in Example 2-2, except that amount of the added amino compound having two amino groups and not having carboxyl group [N-β-(aminoethyl)-γ-aminopropylmethyldimethoxysilane] was changed to 1.2 g (120 parts by weight based on 100 parts by weight of the color pigment), was mixed with 0.3 g of acrylic acid, 0.3 g of ditrimethylolpropane tetraacrylate, 0.3 g of glycidyl methacrylate and 0.3 g of styrene (total: 12 parts by weight of monomers based on 100 parts by weight of the colored substrate particles), and the mixture was heated at 80° C. with stirring in an atmosphere of nitrogen to carry out polymerization of the monomers by adding 0.05 g of azobisisobutyronitrile as an initiator, thereby effecting precipitation of the resulting polymer on the surface of the colored substrate particles. After the treatment, the resulting slurry was subjected to solid-liquid separation to make it into a paste of 50% in solid content.
(Test 2-1)

On the color tones of the colored substrate particles obtained in Examples 2-22 to 2-26 and Comparative Examples 2-8 to 2-10, chroma and metallic luster of plates coated with paints which have been prepared using these pigments were evaluated with the naked eye on the basis of the aforementioned evaluation criteria. The paints were prepared by mixing 10 parts by weight of respective colored substrate particles with 100 parts by weight of a varnish for automobile repairing use (Auto Clear, manufactured by Nippon Paint) and dispersing them using a disper. Each of the thus prepared paints was coated on a sheet of duplex art paper using a doctor blade of 225 μm (9 mill) to prepare coated plates.

In this case, similar test was carried out on commercially available two types of colored aluminum flakes.
(Test 2-2)

A 0.3 g portion of each of the colored substrate particles obtained in Examples 2-22 to 2-26 and Comparative Examples 2-8 to 2-10 was dispersed in 30 g of each of four solvents, namely toluene, isopropyl alcohol, ethyl acetate and methyl ethyl ketone, using a disper at 3,200 rpm for 3 minutes, the thus obtained dispersion was allowed to stand for 24 hours and then the resulting supernatant was observed to evaluate degree of the pigment fall off.

In this case, similar test was carried out on commercially available colored substrate particles.

Results of the Tests 2-1 and 2-2 are shown in Table 2-3. The evaluation of each test is based on the aforementioned criteria.

Example 2-27

A 20 g portion of the colored substrate particles obtained in Example 2-22 were mixed with 80 g of a commercially available thermosetting acrylic resin varnish (Acrydic A-322, manufactured by Dainippon Ink & Chemicals) and 17 g of a melamine resin varnish (Super Beckamine L-117-

60, manufactured by Dainippon Ink & Chemicals) and dispersed using a disper to prepare a blue metallic paint. The thus prepared metallic paint was diluted with 100 g of a thinner (ethyl acetate:butyl acetate:xylene:cellosolve acetate:solvesso #100=15:6:20:9:12) and coated on a mild steel plate using an air spray, and the resulting coat layer was further air spray-coated with a clear paint composed of 56 g of a commercially available thermosetting acrylic resin varnish (Acrydic A-345, manufactured by Dainippon Ink & Chemicals), 22 g of a melamine resin varnish (Super Beckamine L-117-60, manufactured by Dainippon Ink & Chemicals) and 70 g of a thinner (the just described composition). The thus coated plate was baked at 140° C. to obtain a two coat-one bake metallic paint film. The thus obtained paint film showed a bright blue color and excellent metallic luster.

Comparative Example 2-11

A metallic paint was prepared in the same manner as described in Example 2-27, except that 14.3 g of substrate particles (solid content, 70%) prepared under the same conditions of Comparative Example 2-2 were used as the pigment, and a two coat-one bake metallic paint film was obtained in the same manner. The thus obtained paint film was inferior to the paint film obtained in Example 2-27 in terms of the brightness of color.

Example 2-28

A 100 g portion of polyethylene resin was blended with 3 g (as aluminum content) of the colored substrate particles obtained in Example 2-22 to prepare a molded product by injection molding. The thus molded product showed a bright blue metallic appearance.

Comparative Example 2-12

A molded product was prepared in the same manner as described in Example 2-23, except that 3 g (as aluminum content) of the substrate particles obtained in Comparative Example 2-2 were used as the pigment. The thus molded product showed a metallic appearance but the color was not so bright.

Example 3-1

A 1 g portion of a commercially available diketopyrrolopyrrole based red pigment (IRGAZIN DPP RED BO, manufactured by Ciba-Geigy Japan) was mixed with 0.5 g (50 parts by weight based on 100 parts by weight of the pigment) of benzoic acid and 10 g of mineral spirit, and the mixture was subjected to 24 hours of ball mill dispersion using a pot mill of 5 cm in diameter and 300 cc in internal volume which has been charged with 200 g of glass beads of 1 mm in diameter. Thereafter, the pot mill was supplemented with 11.4 g (10 g as metal content) of a commercially available aluminum paste (MG 1000, manufactured by Toyo Aluminium; metal content, 70%; average particle size, 30 µm; average thickness, 1 µm; specific surface area, 1.4 m$^2$/g) and 20 g of mineral spirit, and the ball mill dispersion was carried out for additional 1 hour. When the thus obtained slurry was washed with 70 g of mineral spirit to separate it from glass beads and then allowed to stand for a while to effect precipitation of aluminum flakes, the resulting supernatant of the slurry became transparent and all portion of the pigment was adhered to the aluminum flakes. Amount of the pigment adhered to the aluminum flakes was found to be 0.07 g/m$^2$.

A slurry containing 10 g of the thus obtained colored metallic pigment was mixed with 0.25 g of methyl methacrylate, 0.25 g of 1,6-hexanediol diacrylate, 0.25 g of styrene and 0.25 g of acrylic acid (total: 10 parts by weight of monomers based on 100 parts by weight of the color pigment-adhered colored metallic pigment), and the mixture was heated at 80° C. with stirring in an atmosphere of nitrogen to carry out 12 hours of reaction by adding 0.05 g of azobisisobutyronitrile as an initiator, thereby effecting polymerization of the monomers and precipitation of the resulting polymer on the surface of the colored metallic pigment. After the treatment, the resulting slurry was subjected to solid-liquid separation to make it into a paste of 50% in solid content.

The thus obtained paste-like composition was put into a vacuum mixer and kneaded for 5 hours at 90° C. under a reduced pressure of 10$^{-1}$ Torr to obtain a colored metallic pigment for powder coating having a solvent content of 0.1%. When the thus obtained colored metallic pigment for powder coating was observed under an optical microscope, the red pigment was adhered to each metallic particle.

Example 3-2

A colored metallic pigment for powder coating having a solvent content of 0.2% was obtained by repeating the procedure of Example 3-1, except that 0.1 g (10 parts by weight based on 100 parts by weight of the pigment) of dialkoxyaluminum alkylacetoacetate (Plain Act ALM, manufactured by Ajinomoto) was added as a chelate compound in addition to benzoic acid. When the thus obtained colored metallic pigment for powder coating was observed under an optical microscope, the color pigment was uniformly adhered to each of the metallic pigment particles.

Examples 3-3 to 3-12 and Comparative Examples 3-1 to 3-3

Colored metallic pigments of Examples 3-3 to 3-12 and Comparative Examples 3-1 to 3-3 were prepared by repeating the procedure of Example 3-1, except that kinds of the color pigment, monobasic aromatic carboxylic acid and chelate compound were changed as shown in Table 3-1.

Table 3-1 also shows compositions of the colored metallic pigments and adhesion conditions of color pigments observed under an optical microscope.

Examples 3-13 to 3-24 and Comparative Examples 3-4 to 3-6

Using the colored metallic pigments of Examples 3-1 to 3-12 and Comparative Examples 3-1 to 3-3, powder coatings were prepared under the following conditions and coated on mild steel plates using a corona electrical charging type electrostatic powder coating machine (MPSI-C, supplied by Matsuo Sangyo) to prepare powder coating paint films.

<Composition of powder coating>
  colored metallic pigment: 4 parts by weight
  uncolored polyester resin paint powder: 96 parts by weight
  (average particle size, 35 µm)
  These powder samples were mixed using a potable V type mixer to prepare a paint.

<Conditions for coating and baking>
  Electrostatic powder coating was effected at an applied voltage of 100 V, and baking was carried out at 180° C. for 20 minutes.

Comparative Example 3-7

A powder coating paint film was prepared in the same manner as described in Example 3-13, except that 96.38 parts by weight of a colored polyester resin powder in which 0.38 part by weight of a diketopyrrolopyrrole based red pigment (IRGAZIN DPP RED BO, Ciba-Geigy Japan) has been blended was used in stead of the uncolored polyester resin powder and 9.62 parts by weight of uncolored aluminum flakes (prepared by dispersing MG 1000, Toyo Aluminium, in acetone and suction-filtering the dispersion using a glass filter, thereby making it into powder) were used as the metallic pigment.

Color tones of the paint films obtained in Examples 3-13 to 3-24 and Comparative Examples 3-4 to 3-7 were observed by the naked eye to examine them by a five-rank evaluation, with the results shown in Table 3-2.

(Evaluation criteria of chroma)
5: markedly clear coloration of color pigment
4: clear coloration of color pigment
3: mediocre coloration of color pigment
2: only slight coloration of color pigment
1: almost no coloration of color pigment

Examples 3-25 and 3-26 and Comparative Examples 3-8 to 3-10

The colored metallic pigment obtained in Example 3-1 was mixed with mineral spirit as a solvent, thereby preparing three colored metallic pigments having different solvent content. To 4 parts by weight of each of these colored metallic pigments was added 96 parts by weight of an uncolored polyester resin powder, followed by their mixing using a V type mixer to prepare a powder coating. Each of the thus prepared powder coating was coated and baked in the same manner as described in Example 3-1 to obtain a powder coating paint film. Appearances of the thus obtained paint films are shown in Table 3-3.

Examples 3-27 to 3-29 and Comparative Examples 3-11 and 3-12

Five samples of colored metallic pigments having different amount of coated polymer were prepared in the same manner as described in Example 3-1, except that the amount of added polymerizable monomer was changed. Using the thus obtained colored metallic pigments, powder coating paint films were prepared in the same manner as described in Example 3-13 to evaluate their appearances in terms of chroma, metallic touch and luster. The results were evaluated in five steps, and each item considered good was given 4 points or more. Withstand voltage of each colored metallic pigment was measured by the following method.

Measuring method of metallic pigment withstand voltage

Figure 2:
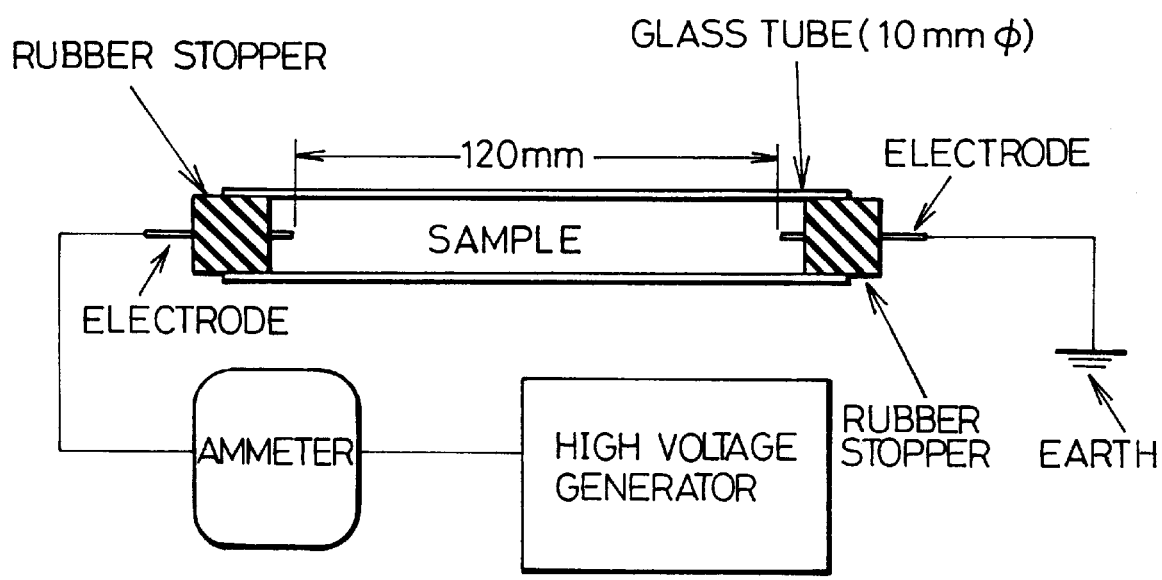
FIG. 2 is a schematic illustration showing the withstand voltage measuring apparatus used in examples.

A paint containing each of the metallic pigment samples was prepared according to the following composition, and its withstand voltage was measured using a withstand voltage measuring apparatus shown in FIG. 2.

| | |
|---|---|
| Acrydic 47-712 (an acrylic resin varnish, manufactured by Dainippon Ink & Chemicals) | 80 pbw |
| Super Beckamine J-820 (a melamine resin varnish, manufactured by Dainippon Ink & Chemicals) | 20 pbw |
| n-Butyl alcohol | 25 pbw |
| Metallic pigment | 3.75 pbw |

The measurement was carried out in accordance with the following procedure:
(1) a paint to be measured is sealed in a glass tube,
(2) a voltage of 5 kV is applied to the paint and kept for 1 minute while checking current leakage with an ammeter,
(3) when there is no current leakage, the applied voltage is further increased by a factor of 5 kV and the steps (1) and (2) are repeated, and then
(4) the steps (1) and (2) are repeated by increasing the applied voltage by a factor of 5 kV stepwise until it reaches 120 kV, and the maximum voltage by which current leakage does not occur is used as the withstand voltage of the metallic paint.

The results are shown in Table 3-4. In Table 3-4, amounts of the monomer added and polymer coated are expressed as parts by weight based on 100 parts by weight of the color pigment-adhered colored metallic pigment. The coated amount of polymer was calculated by measuring the metal content of the colored metallic pigment by an atomic absorption analysis and subtracting amount of the added pigment from the content of other components than the metal.

Example 3-30

A powder coating paint film was prepared in the same manner as described in Example 3-13, except that a mixture of 2 parts by weight of each of a colored metallic pigments obtained in Examples 3-3 and 3-7 was used as a colored metallic pigment, and that an acrylic polymer base paint powder having a particle size of 50 μm was used as a paint powder. The resulting paint film showed good appearance and a special polychroismic effect in which colors change depending on the looking directions.

Example 4-1

A surface-treated steel plate (a steel plate of JIS G3310 which has been subjected to a zinc phosphate-based chemical conversion treatment) electro-coated with a cationic electrode-position paint for automobile use was subjected to intermediate coating with a polyester/melamine resin.

The steel plate thus treated with electrodeposition coating and intermediate coating was subjected to air spray coating with a paint composition for colored base coat use and a paint composition for clear coat use, having respective compositions as shown below, by a two coat-one bake method and then baked at 140° C. for 30 minutes to prepare a metallic coating paint film. Film thicknesses of the colored base coat layer and clear coat layer after hard drying were found to be 20 μm and 40 μm, respectively.

| <Paint composition for colored base coat use (present invention)> | |
|---|---|
| Flaky red colored metallic pigment #1 | 10 parts |
| Thermosetting acrylic resin (solid content) | 80 parts |
| Butylated melamine resin (solid content) | 20 parts |
| <Paint composition for clear coat use> | |
| Thermosetting acrylic resin (solid content) | 80 parts |
| Butylated melamine resin (solid content) | 20 parts |

The pigment # 1 is a flaky colored aluminum pigment prepared by adhering a diketopyrrolopyrrole based red color pigment to the surface of each particle and subsequently coating the resulting particles with 15 parts by weight/100 parts by weight of an acrylic ester copolymer polymerized by in situ polymerization, which showed a maximum particle size of 37 µm, an average particle size of 16 µm and an average thickness of 0.6 µm.

When chroma, paint film clearness and color anisotropy of the thus obtained metallic coating paint film were examined with the naked eye by a five step evaluation (5: very excellent, 4: excellent, 3: mediocre, 2: slightly inferior, 1: inferior), its chroma and clearness were rated 5 and its color anisotropy was rated 3.

Examples 4-2 to 4-9 and Comparative Examples 4-1 to 4-3

Metallic coating paint films of Examples 4-2 to 4-9 and Comparative Examples 4-1 to 4-3 were prepared in the same manner as described in Example 4-1, except that the paint composition for colored base coat use was changed as shown in Table 4-1. Their appearances were examined with the naked eye by the five-rank evaluation described in Example 4-1, with the results also shown in Table 4-1.

In the table, the pigment # 2 is a flaky colored aluminum pigment prepared by adhering a phthalocyanine green based color pigment to the surface of each particle and subsequently coating the resulting particles with 15 parts by weight/100 parts by weight of an acrylic ester copolymer polymerized by in situ polymerization, which showed a maximum particle size of 37 µm, an average particle size of 16 µm and an average thickness of 0.6 µm.

The pigment # 3 is a flaky colored aluminum pigment prepared by adhering a phthalocyanine blue based color pigment to the surface of each particle and subsequently coating the resulting particles with 15 parts by weight/100 parts by weight of an acrylic ester copolymer polymerized by in situ polymerization, which showed a maximum particle size of 37 µm, an average particle size of 16 µm and an average thickness of 0.6 µm.

The pigment # 4 is a flaky colored aluminum pigment manufactured by Toyo Aluminium, which has been prepared by adhering isoindolinone orange to the surface of each particle and subsequently coating the resulting particles with 10 parts by weight/100 parts by weight of an acrylic ester copolymer polymerized by in situ polymerization, which has a maximum particle size of 37 µm, an average particle size of 18 µm and an average thickness of 0.8 µm.

The pigment # 5 is a titanium flake pigment colored in gold by forming a light coherent oxide film on the surface of each particle, which showed a maximum particle size of 45 µm, an average particle size of 20 pm and an average thickness of 1.5 µm.

The pigment # 6 is a titanium flake pigment colored in purple by forming a light coherent oxide film on the surface of each particle, which showed a maximum particle size of 45 µm, an average particle size of 20 µm and an average thickness of 1.5 µm.

The pigment TCR 3080 is an uncolored aluminum flake pigment having a maximum particle size of 37 µm, an average particle size of 15 µm and an average thickness of 0.5 µm.

TABLE 1-1

Relationship between dispersion conditions of surface-treated color pigment and adhesion condition of pigment

| | Monobasic aromatic carboxylic acid | Amount (parts) | Chelate compound | Amount (parts) | Adhesion condition of pigment |
|---|---|---|---|---|---|
| Ex. 1-1 | benzoic acid | 50 | — | — | 3 |
| Ex. 1-2 | benzoic acid | 50 | A | 10 | 5 |
| Ex. 1-3 | p-aminosalicylic acid | 50 | A | 10 | 5 |
| Ex. 1-4 | p-aminosalicylic acid | 5 | A | 1 | 5 |
| Ex. 1-5 | p-aminosalicylic acid | 1 | A | 0.2 | 4 |
| Ex. 1-6 | p-aminosalicylic acid | 50 | B | 10 | 5 |
| Ex. 1-7 | p-aminosalicylic acid | 50 | C | 10 | 5 |
| Ex. 1-8 | anthranilic acid | 50 | A | 10 | 5 |
| Ex. 1-9 | 2-naphthoic acid | 50 | A | 10 | 5 |
| Ex. 1-10 | benzoic acid | 50 | D | 10 | 3 |
| Ex. 1-11 | salicylic acid | 50 | A | 10 | 3 |
| Ex. 1-12 | vinyl benzoate | 50 | A | 10 | 3 |
| Comp. Ex. 1-1 | — | — | — | — | 1 |
| Comp. Ex. 1-2 | — | — | A | 10 | 1 |
| Comp. Ex. 1-3 | benzoic acid | 0.1 | A | 10 | 2 |
| Comp. Ex. 1-4 | terephthalic acid | 50 | A | 10 | 2 |
| Comp. Ex. 1-5 | o-aminophenol | 50 | A | 10 | 1 |

(Chelate compound)
A: dialkoxyaluminum alkylacetoacetate (Alumi Chelate M, Ajinomoto)
B: aluminum trialkylacetoacetate (ALCH-TR, Kawaken Fine Chemicals)
C: dialkoxytitanium bisacetylacetonate (Alkofine TIA-2, Kawaken Fine Chemicals)
D: commercial pigment dispersant (silicon-base high molecular surface active agent) (Homogenol L-100, Kao Corp.)

TABLE 1-2

Relationship between composition of colored substrate particles and adhesion condition of pigment

| | Substrate particles | Color pigment | Pigment added (part) | Pigment per unit surface (g/m$^2$) | adhesion condition of pigment |
|---|---|---|---|---|---|
| Ex. 1-13 | aluminum | phthalocyanine blue | 10 | 0.07 | 4 |
| Ex. 1-14 | aluminum | phthalocyanine green | 20 | 0.14 | 5 |
| Ex. 1-15 | aluminum | quinacridone maroon | 20 | 0.14 | 5 |
| Ex. 1-16 | aluminum | quinacridone gold | 15 | 0.11 | 5 |
| Ex. 1-17 | aluminum | isoindolinone orange | 15 | 0.11 | 5 |
| Ex. 1-19 | aluminum | perylene maroon | 20 | 0.14 | 4 |
| Ex. 1-19 | aluminum | diketopyrrolopyrrole | 3 | 0.02 | 5 |
| Ex. 1-20 | aluminum | carbon black | 50 | 0.36 | 5 |
| Ex. 1-21 | aluminum | titanium oxide | 10 | 0.07 | 4 |
| Ex. 1-22 | stainless steel | dioxazine violet | 5 | 0.10 | 5 |
| Ex. 1-23 | mica | quinacridone gold | 5 | 0.07 | 4 |
| Ex. 1-24 | glass beads | carbon black | 0.2 | 0.40 | 5 |
| Comp. Ex. 1-6 | aluminum | diketopyrrolopyrrole | 1 | 0.007 | 2 |
| Comp. Ex. | aluminum | diketopyrrolo- | 75 | 0.54 | 5 |

TABLE 1-2-continued

Relationship between composition of colored substrate particles and adhesion condition of pigment

| Substrate particles | Color pigment | Pigment added (part) | Pigment per unit surface (g/m$^2$) | adhesion condition of pigment |
|---|---|---|---|---|
| 1-7 | pyrrole | | | (much free pigment) |

(Property of substrate particles)
Aluminum: average particle size = 30 μm, specific surface area = 1.4 m$^2$/g
Stainless steel: average particle size = 20 μm, specific surface area = 0.5 m$^2$/g
Mica: average particle size = 30 μm, specific surface area = 0.7 m$^2$/g
Glass beads: average particle size = 200 μm, specific surface area = 0.005 m$^2$/g
(Color pigment)
Diketopyrrolopyrrole: Ciba-Geigy Japan IRGAZIN DPP RED BO
Phthalocyanine blue: BASF Japan HELIOGEN BLUE L6900
Phthalocyanine green: BASF Japan HELIOGEN GREEN L8730
Quinacridone maroon: Ciba-Geigy Japan CINQUASIA MAROON RT-692-D
Quinacridone gold: Ciba-Geigy Japan CINQUASIA GOLD YT-923-D
Perylene maroon: BASF Japan PALIOGEN MAROON L3920
Dioxazine violet: Dainippon Ink & Chemicals FASTOGEN SUPER VIOLET RTS
Titanium oxide: Ishihara Sangyo Microparticle Titanium Oxide TTO
Carbon black: Mitsubishi Chemical #2300

TABLE 1-3

Color tone and solvent resistance of colored substrate particles

| Pigment | Color tone | | Solvent resistance | | | |
|---|---|---|---|---|---|---|
| | Chroma | Luster | IPA | Toluene | MEK | Ethyl acetate |
| Ex. 1-25 | 5 | 5 | ○ | ○ | Δ | Δ |
| Ex. 1-26 | 5 | 4 | ○ | ○ | ○ | ○ |
| Ex. 1-27 | 4 | 4 | ○ | ○ | ○ | ○ |
| Ex. 1-28 | 5 | 5 | Δ | Δ | ○ | ○ |
| Ex. 1-29 | 5 | 5 | Δ | ○ | ○ | ○ |
| Comp.Ex. 1-8 | 2 | 5 | ○ | ○ | ○ | ○ |
| Comp.Ex. 1-9 | 5 | 5 | x | x | x | x |
| Comp.Ex. 1-10 | 5 | 5 | x | x | x | x |
| Commercial 1-1 | 3 | 4 | x | ○ | x | x |
| Commercial 1-2 | 3 | 4 | x | x | x | x |

Commercial 1-1: Friend Color F500BL, (Showa Aluminum Powder)
Commercial 1-2: Friend Color F500RE, (by Showa Aluminum Powder)

TABLE 2-1

Relationship between composition of surface-treated color pigment and adhesion condition of pigment

| | Amino compound | Amount (part) | Chelate compound | Amount (part) | Adhesion condition of pigment |
|---|---|---|---|---|---|
| Ex. 2-1 | a | 50 | — | — | 3 |
| Ex. 2-2 | a | 50 | A | 10 | 4 |
| Ex. 2-3 | b | 50 | A | 10 | 5 |
| EX. 2-4 | c | 50 | A | 10 | 5 |
| Ex. 2-5 | d | 50 | A | 10 | 5 |
| Ex. 2-6 | d | 0.5 | A | 0.2 | 4 |
| Ex. 2-7 | d | 50 | B | 10 | 5 |
| Ex. 2-8 | d | 50 | C | 10 | 5 |
| Ex. 2-9 | e | 50 | A | 10 | 4 |
| Ex. 2-10 | f | 50 | D | 10 | 3 |
| Comp. Ex. 2-1 | — | — | — | — | 1 |
| Comp. Ex. 2-2 | — | — | A | 10 | 1 |
| Comp. Ex. 2-3 | b | 0.1 | A | 10 | 2 |
| Comp. Ex. 2-4 | laurylamine | 50 | A | 10 | 1 |
| Comp. Ex. 2-5 | γ-aminopropyl trimethoxysilane | 50 | A | 10 | 2 |

(Amino compound)
a: N-β-(aminoethyl)-γ-aminopropylmethyldimethoxysilane
b: N-β-(aminoethyl)-γ-aminopropyltrimethoxysilane
c: dodecamethylenediamine
d: hexamethylenediamine
e: p-phenylenediamine
f: 1,8-diaminonaphthalene
(Chelate compound)
A: dialkoxyaluminum alkylacetoacetate (Alumi Chelate M, Ajinomoto)
B: aluminum trialkylacetoacetate (ALCH-TR, Kawaken Fine Chemicals)
C: dialkoxytitanium bisacetylacetonate (Alkofine TIA-2, Kawaken Fine Chemicals)
D: commercial pigment dispersant (silicon base high molecular surface active agent) (Homogenol L-100, Kao Corp.)

TABLE 2-2

Relationship between composition of colored substrate particle and adhesion condition of pigment

| | Substrate particles | Color pigment | Pigment (part) | Pigment adhered per unit surface area (g/m$^2$) | Adhesion condition of pigment |
|---|---|---|---|---|---|
| Ex. 2-11 | aluminum | phthalocyanine green | 10 | 0.07 | 4 |
| Ex. 2-12 | aluminum | diketo-pyrrolopyrrole | 20 | 0.14 | 5 |
| Ex. 2-13 | aluminum | quinacridone red | 20 | 0.14 | 5 |
| Ex. 2-14 | aluminum | quinacridone gold | 15 | 0.11 | 5 |
| Ex. 2-15 | aluminum | isoindolinone orange | 15 | 0.11 | 5 |
| Ex. 2-16 | aluminum | perylene maroon | 20 | 0.14 | 4 |
| Ex. 2-17 | aluminum | phthalocyanine blue | 3 | 0.02 | 5 |
| Ex. 2-18 | aluminum | titanium oxide | 50 | 0.36 | 5 |
| Ex. 2-19 | aluminum | carbon black | 10 | 0.07 | 4 |
| Ex. 2-20 | stainless steel | phthalocyanine blue | 5 | 0.10 | 5 |
| Ex. 2-21 | mica | quinacridone gold | 5 | 0.07 | 4 |
| Comp. Ex. 2-6 | aluminum | phthalocyanine blue | 1 | 0.007 | 2 |
| Comp. Ex. 2-7 | aluminum | phthalocyanine blue | 75 | 0.54 | 5 (much free pigment) |

(Property of substrate particles)
Aluminum: average particle size = 30 μm, specific surface area = 1.4 m$^2$/g
Stainless steel: average particle size = 20 μm, specific surface area = 0.5 m$^2$/g
Mica: average particle size = 30 μm, specific surface area = 0.7 m$^2$/g
(Color pigment)
Phthalocyanine green: BASF Japan HELIOGEN GREEN L8730
Diketopyrrolopyrrole: Ciba-Geigy Japan IRGAZIN DPP RED BO

TABLE 2-2-continued

Relationship between composition of colored substrate particle and adhesion condition of pigment

| Substrate particles | Color pigment | Pigment (part) | Pigment adhered per unit surface area (g/m²) | Adhesion condition of pigment |
|---|---|---|---|---|

Quinacridone red: Ciba-Geigy Japan CINQUASIA RED RT-759-D
Quinacridone gold: Ciba-Geigy Japan CINQUASIA GOLD YT-923-D
Isoindolinone orange: Ciba-Geigy Japan CROMOPHTAL ORANGE 2G
Perylene maroon: BASF Japan PALIOGEN MAROON L3920
Phthalocyanine blue: BASF Japan HELIOGEN BLUE L6900
Carbon black: Mitsubishi chemical #2300
Titanium oxide: Ishihara Sangyo Microdust Titanium Oxide TTO

TABLE 2-3

Color tone and solvent resistance of colored substrate particles

| Pigment | Color tone | | Solvent resistance | | | |
|---|---|---|---|---|---|---|
| | Chroma | Luster | IPA | Toluene | MEK | Ethyl acetate |
| Ex. 2-22 | 4 | 5 | Δ | Δ | ○ | ○ |
| Ex. 2-23 | 5 | 5 | ○ | ○ | ○ | ○ |
| Ex. 2-24 | 5 | 4 | ○ | ○ | ○ | ○ |
| Ex. 2-25 | 5 | 5 | ○ | Δ | ○ | Δ |
| Ex. 2-26 | 5 | 5 | ○ | ○ | ○ | ○ |
| Comp.Ex.2-8 | 2 | 5 | ○ | ○ | ○ | ○ |
| Comp.Ex.2-9 | 5 | 5 | x | x | x | x |
| Comp.Ex.2-10 | 5 | 4 | x | x | x | x |
| Commercial 2-1 | 3 | 4 | x | ○ | x | x |
| Commercial 2-2 | 3 | 4 | x | x | x | x |

Commercial 2-1: Friend Color F500BL, (Showa Aluminum Powder)
Commercial 2-2: Friend Color F500RE, (Showa Aluminum Powder)

TABLE 3-1

Relationship between composition of colored metallic particles and adhesion condition of pigment

| | Color pigment | Monobasic aromatic carboxylic acid | Chelate compound | Adhesion condition of pigment |
|---|---|---|---|---|
| Ex. 3-1 | diketopyrrolopyrrole | benzoic acid | — | 3 |
| Ex. 3-2 | diketopyrrolopyrrole | benzoic acid | A | 4 |
| Ex. 3-3 | diketopyrrolopyrrole | anthranilic acid | A | 5 |
| Ex. 3-4 | diketopyrrolopyrrole | p-aminosalicylic acid | A | 5 |
| Ex. 3-5 | isoindolinone | p-aminosalicylic acid | A | 4 |
| Ex. 3-6 | perylene red | p-aminosalicylic acid | A | 5 |
| Ex. 3-7 | phthalocyanine green | p-aminosalicylic acid | A | 5 |
| Ex. 3-8 | diketopyrrolopyrrole | p-aminosalicylic acid | B | 5 |
| Ex. 3-9 | diketopyrrolopyrrole | 2-naphthoic acid | A | 5 |
| Ex. 3-10 | titanium oxide | benzoic acid | A | 5 |
| Ex. 3-11 | diketopyrrolopyrrole | salicylic acid | A | 3 |
| Ex. 3-12 | diketopyrrolopyrrole | vinyl benzoate | A | 3 |
| Comp. Ex. 3-1 | diketopyrrolopyrrole | — | — | 1 |
| Comp. Ex. 3-2 | diketopyrrolopyrrole | — | A | 1 |
| Comp. Ex. 3-3 | diketopyrrolopyrrole | terephthalic acid | A | 2 |

(Color pigment)

Diketopyrrolopyrrole: Ciba-Geigy Japan IRGAZIN DPP RED BO
Phthalocyanine green: BASF Japan HELIOGEN GREEN L8730
Perylene red: BASF Japan PALIOGEN RED L3910HD
Isoindolinone: BASF Japan PALIOTOL YELLOW L1820
Titanium oxide: Ishihara Sangyo Microdust Titanium Oxide TTO (Chelate Compound)

A: dialkoxyaluminum alkylacetoacetate (Pren Act ALM, Ajinomoto)
B: dialkoxytitanium bisacetylacetonate (Alkofine TIA-2, Kawaken Fine Chemicals)

TABLE 3-2

Color tone of powder coating paint film

| | Metallic pigment | Paint powder | Color tone of powder coat paint film |
|---|---|---|---|
| Ex. 3-13 | sample of Ex. 3-1 | uncolored polyester | 3 |
| Ex. 3-14 | sample of Ex. 3-2 | uncolored polyester | 4 |
| Ex. 3-15 | sample of Ex. 3-3 | uncolored polyester | 5 |
| Ex. 3-16 | sample of Ex. 3-4 | uncolored polyester | 5 |
| Ex. 3-17 | sample of Ex. 3-5 | uncolored polyester | 4 |
| Ex. 3-18 | sample of Ex. 3-6 | uncolored polyester | 5 |
| Ex. 3-19 | sample of Ex. 3-7 | uncolored polyester | 5 |
| Ex. 3-20 | sample of Ex. 3-8 | uncolored polyester | 5 |
| Ex. 3-21 | sample of Ex. 3-9 | uncolored polyester | 5 |
| Ex. 3-22 | sample of Ex. 3-10 | uncolored polyester | 5 |
| Ex. 3-23 | sample of Ex. 3-11 | uncolored polyester | 3 |
| Ex. 3-24 | sample of Ex. 3-12 | uncolored polyester | 3 |
| Comp. Ex. 3-4 | sample of Comp. Ex. 3-1 | uncolored polyester | 1 |
| Comp. Ex. 3-5 | sample of Comp. Ex. 3-2 | uncolored polyester | 1 |
| Comp. Ex. 3-6 | sample of Comp. Ex. 3-3 | uncolored polyester | 2 |
| Comp. Ex. 3-7 | uncolored aluminum flakes | red-colored polyester | 1 (many seeds) |

TABLE 3-3

Solvent content of colored metallic particles and appearance of powder coating paint films obtained therefrom

|  | Solvent content (% by weight) | Appearance of powder coating paint film |
|---|---|---|
| Ex. 3-25 | 2 | very good |
| Ex. 3-26 | 4 | good |
| Comp. Ex. 3-8 | 7 | presence of some mottled color |
| Comp. Ex. 3-9 | 10 | presence of mottled color |
| Comp. Ex. 3-10 | 50 | generation of seeds due to agglomeration of metallic pigment |

TABLE 3-4

Coated polymer amount of colored metallic particles and appearance of powder coating paint films obtained therefrom

|  | Monomer added (pbw) | Polymer coated (pbw) | Withstand voltage (kv) | Appearance of powder coating paint films Chroma | Metallic touch | Luster |
|---|---|---|---|---|---|---|
| Ex. 3-27 | 4 | 3.5 | 80 | 4 | 5 | 5 |
| Ex. 3-28 | 20 | 18 | >120 | 5 | 5 | 5 |
| Ex. 3-29 | 50 | 43 | >120 | 5 | 5 | 4 |
| Comp.Ex. 3-11 | 0 | 0 | 15 | 1 | 1 | 1 (seeds) |
| Comp.Ex. 3-12 | 0.4 | 0.3 | 40 | 2 | 2 | 4 |

TABLE 4-1

Formation conditions of metallic coating paint films and their appearances

Composition of colored base coat layer

|  | Pigment (part) | Resin (solid content) | (part) | Chroma | Clearness | Anisotropy |
|---|---|---|---|---|---|---|
| Ex. 4-1 | #1:10 | thermosetting acrylic resin:<br>butylated melamine resin: | 80<br>20 | 5 | 5 | 3 |
| Ex. 4-2 | #2:10 | thermosetting polyester resin:<br>butylated melamine resin: | 70<br>30 | 5 | 5 | 3 |
| Ex. 4-3 | #5:10 | thermosetting acrylic resin:<br>butylated melamine resin: | 80<br>20 | 5 | 4 | 5 |
| Ex. 4-4 | #6:10 | thermosetting acrylic resin:<br>butylated melamine resin: | 80<br>20 | 5 | 4 | 5 |
| Ex. 4-5 | #1:5<br>#3:5 | thermosetting acrylic resin:<br>butylated melamine resin: | 80<br>20 | 5 | 5 | 5 |
| Ex. 4-6 | #1:5<br>#6:5 | thermosetting acrylic resin:<br>butylated melamine resin: | 80<br>20 | 5 | 5 | 5 |
| Ex. 4-7 | #1:5<br>*1:2 | thermosetting acrylic resin:<br>butylated melamine resin: | 80<br>20 | 4 | 5 | 5 |
| Ex. 4-8 | #1:8<br>*2:2 | thermosetting acrylic resin:<br>butylated melamine resin: | 80<br>20 | 5 | 4 | 4 |
| Ex. 4-9 | #4:10 | thermosetting polyester resin:<br>butylated melanine resin: | 70<br>30 | 5 | 5 | 3 |
| Comp.Ex. 4-1 | *3:5<br>*4:2 | thermosetting acrylic resin:<br>butylated melamine resin: | 80<br>20 | 3 | 5 | 2 |
| Comp.Ex. 4-2 | *3:8<br>*4:1<br>*1:1 | thermosetting acrylic resin:<br>butylated melamine resin: | 80<br>20 | 3 | 5 | 2 |
| Comp.Ex. 4-3 | *2:10 | thermosetting acrylic resin:<br>butylated melamine resin: | 80<br>20 | 2 | 3 | 4 |

*1:phthalocyanine blue
*2:coherent blue mica
*3:TCR 3080
*4:diketopyrrolopyrrole

We claim:

1. A colored metallic pigment for powder coating in which the surface of colored metallic particles resulting from adhesion of a color pigment to surfaces of metallic particles is coated with a polymer synthesized by in situ polymerization of a polymerizable monomer, wherein the pigment contains 5% by weight or less residual solvent.

2. The colored metallic pigment for powder coating according to claim 1 whose withstand voltage is 80 kV or more.

3. A powder coating composition comprising 0.1 to 30 parts by weight of the colored metallic pigment for powder coating of claim 1 dry-blended with 100 parts by weight of a paint resin powder.

4. A paint composition which comprises colored flaky metallic particles having a maximum particle size of 50 μm or less, an average particle size of 5 to 35 μm and an average thickness of 2 μm or less, resulting from adhesion of a color pigment to each particle surface and subsequent coating with a polymer polymerized by in situ polymerization or from coloring of each particle surface through formation of a light coherent oxide film thereon.

5. A paint composition according to claim 4 which comprises, in addition to said colored flaky metallic particles, at least one substance selected from a color pigment and mica.

6. Colored substrate particles comprising a surface-treated color pigment adhered to substrate particles in an amount of 0.01 to 0.5 g per 1 $m^2$ surface area of the substrate particles, wherein the surface-treated color pigment comprises a non-metallic color pigment coated with 0.2 to 100 parts by weight, per 100 parts by weight of the pigment, of a surface-treatment agent selected from the group consisting of a monobasic aromatic carboxylic acid and an amino compound having 2 amino groups in its molecule and not having a carboxyl group and wherein said colored substrate particles are coated with a polymer polymerized by in situ polymerization of a polymerizable monomer.

7. The color substrate particles according to claim 6, wherein the monobasic aromatic carboxylic acid is at least one compound selected from the group consisting of benzoic acid, aminobenzoic acid, aminohydroxybenzoic acid, naphthoic acid, aminonaphthoic acid, cinnamic acid and aminocinnamic acid and the amino compound is at least one compound selected from the group consisting of an aliphatic diamine having 6 to 12 carbon atoms, N-β-(aminoethyl)-γ-aminopropyltrimethoxysilane and N-β-(aminoethyl)-γ-aminopropylmethyldimethoxysilane.

8. Colored substrate particles comprising a surface-treated color pigment adhered to substrate particles in an amount of 0.01 to 0.5 g per 1 $m^2$ surface area of the substrate particles, wherein the surface-treated pigment comprises a pigment coated with 0.2 to 100 parts by weight, per 100 parts by weight of the pigment, of a surface-treatment agent; and 0.1 to 50 parts by weight, per 100 parts by weight of the pigment of an aluminum or titanium chelate compound and wherein said colored substrate particles are coated with a polymer polymerized by in situ polymerization of a polymerizable monomer.

9. Colored substrate particles comprising a surface-treated color pigment adhered to substrate particles in an amount of 0.01 to 0.5 g per 1 $m^2$ surface area of the substrate particles, and wherein said colored substrate particles are coated with a polymer polymerized by in situ polymerization of a polymerizable monomer and wherein the surface-treated color pigment is selected from the group consisting of phthalocyanine, halogenated phthalocyanine, quinacridone, diketopyrrolopyrrole, isoindolinone, azomethine metal complex, indanthrone, perylene, perynone, anthraquinone, dioxazine, benzoimidazolone, condensed azo, triphenyl methane, quinophthalone, anthrapyrimidine, titanium oxide, iron oxide and carbon black whose surfaces are coated with 0.2 to 100 parts by weight, per 100 parts by weight of the pigment, of a surface-treatment agent selected from the group consisting of a monobasic aromatic carboxylic acid and an amino compound having 2 amino groups in its molecule and not having a carboxyl group.

10. The colored substrate particles according to claim 6, 7, 8 or 9 wherein the surfaces are coated with a silane coupling agent having at least one amino group or a titanium coupling agent having at least one amino group or both a silane and a titanium coupling agent.

11. A resin composition comprising a resin and 0.1 to 30% by weight of the colored substrate particles of claim 6, 7, 8 or 9.

12. A process for producing colored substrate particles which comprises the steps of a. preparing a dispersion comprising a surface-treated color pigment by dispersing a color pigment in a nonpolar solvent, in the presence of a surface-treatment agent and optionally a chelate compound, thereby forming a coat layer composed of the surface-treatment agent or of the surface-treatment agent and the chelate compound, b. adhering said surface-treated color pigment on the surface of substrate particles by mixing said dispersion of surface-treated color pigment with said substrate particles, c. if desired, adding a polymerizable monomer and an initiator and heating the mixture with stirring, thereby effecting synthesis of a polymer from said polymerizable monomer and subsequent precipitation of said polymer on the surface of colored substrate particles.

13. A process for producing the colored metallic pigment for powder coating according to claim 1 which comprises the steps of:

a. preparing a dispersion comprising a surface-treated color pigment by dispersing a color pigment in a nonpolar solvent, in the presence of a surface-treatment agent and optionally a chelate compound, thereby forming a coat layer composed of the surface-treatment agent or of the surface-treatment agent and the chelate compound, b. adhering said surface-treated color pigment on the surface of metallic particles by mixing said dispersion of surface-treated color pigment with said metallic particles, c. adding a polymerizable monomer and an initiator, and heating the mixture with stirring, thereby effecting synthesis of a polymer from said polymerizable monomer and subsequent precipitation of said polymer on the surface of colored metallic particles, d. making the dispersion containing the polymer-adhered colored metallic particles of the step "c" into a paste by subjecting it a solid-liquid separation to filtration, and e. heating and stirring the paste-like colored metallic particles of the step d under a reduced pressure to remove the solvent.

14. A method for forming paint film which comprises forming a colored base coat layer on a substrate to which electrodeposition and under coating or intermediate coating are applied using the paint composition of claim 4 or 5, and substantially forming a clear coat layer on said colored base coat layer.

* * * * *